(12) United States Patent
Jung et al.

(10) Patent No.: US 12,314,464 B1
(45) Date of Patent: May 27, 2025

(54) METHOD, PROGRAM, SERVER, AND DEVICE FOR DISPLAYING OBJECT IN CONSTRUCTION SITE WITH XR CONTENT WITHOUT USING MARKER

(71) Applicants: SLZ Inc., Siheung (KR); Jae Heon Jung, Seoul (KR); Yu Mi Lee, Incheon (KR)

(72) Inventors: Jae Heon Jung, Seoul (KR); Yu Mi Lee, Incheon (KR)

(73) Assignees: SLZ Inc., Siheung (KR); Jae Heon Jung, Siheung (KR); Yu Mi Lee, Incheon (KR)

( * ) Notice: Subject to any disclaimer, the term of this patent is extended or adjusted under 35 U.S.C. 154(b) by 50 days.

(21) Appl. No.: 18/515,372

(22) Filed: Nov. 21, 2023

(30) Foreign Application Priority Data

Nov. 14, 2023 (KR) .................. 10-2023-0157343

(51) Int. Cl.
*G06F 3/01* (2006.01)
(52) U.S. Cl.
CPC .............. *G06F 3/011* (2013.01); *G06F 3/012* (2013.01); *G06F 3/017* (2013.01)
(58) Field of Classification Search
CPC ......... G06F 3/011; G06F 3/012; G06F 3/0487
See application file for complete search history.

(56) References Cited

U.S. PATENT DOCUMENTS

| 11,694,406 B2 * | 7/2023 | Mitchell | G01S 19/42 |
| | | | 345/419 |
| 11,698,614 B2 * | 7/2023 | Ambühl | H04W 4/029 |
| | | | 700/275 |
| 2020/0379425 A1 * | 12/2020 | Ambühl | G06Q 10/08 |
| 2022/0108529 A1 * | 4/2022 | Mitchell | H04W 4/029 |
| 2022/0398940 A1 * | 12/2022 | Likova | G09B 21/003 |
| 2024/0020931 A1 * | 1/2024 | McKee | G06F 3/0346 |
| 2024/0220009 A1 * | 7/2024 | Dryer | G06F 1/163 |
| 2024/0242405 A1 * | 7/2024 | Yerli | G06F 16/58 |

FOREIGN PATENT DOCUMENTS

| KR | 10-2021-0053549 A | 5/2021 | |
| WO | WO-2023247352 A1 * | 12/2023 | ............ G06Q 50/08 |

* cited by examiner

*Primary Examiner* — Patrick F Marinelli
(74) *Attorney, Agent, or Firm* — Studebaker Brackett PLLC

(57) ABSTRACT

The present disclosure relates to an electronic device of wearable form worn on a user's head and outputting XR content in front of the user including a sensing unit including at least one sensor a display unit, and a processor configured to map BIM data of a construction site in which the user is located to a space within a user's field of view based on sensing information sensed and obtained from the sensing unit, control such that the XR content corresponding to a target is displayed on the display unit, based on a call signal of the target in relation to the construction site being included in a voice-based input signal received from the sensing unit.

18 Claims, 12 Drawing Sheets

METHOD, PROGRAM, SERVER, AND DEVICE FOR DISPLAYING OBJECT IN CONSTRUCTION SITE WITH XR CONTENT WITHOUT USING MARKER

CROSS-REFERENCE TO RELATED APPLICATION

A claim for priority under 35 U.S.C. § 119 is made to Korean Patent Application No. 10-2023-0157343 filed on Nov. 14, 2023 in the Korean Intellectual Property Office, the entire contents of which are hereby incorporated by reference.

BACKGROUND

1. Technical Field

The present disclosure relates to a device for displaying XR content, and more particularly, a method, program, server, and device for displaying an object in a construction site with XR content without using a marker.

2. Description of Related Art

Recently, the augmented reality technology using markers has been applied to a construction site.

However, the markers are used to recognize positions in the construction site and provide all types of objects based on the augmented reality.

Such a method has a difficulty in attaching the markers in accordance with the complex construction site which is changed after various processes have been completed since the markers are installed to objects and needed to be directly recognized.

Accordingly, it is required the technology capable of accurately recognizing various positions in the construction site and output XR content to an electronic device without using the markers. However, such a technology has not been disclosed yet.

PATENT LITERATURE

Patent Documents

Patent Document 1: Korean Patent Publication No. 10-2021-0053549 (published on May 12, 2021)

SUMMARY

The present disclosure has been made to solve the above-mentioned problems occurring in the prior art, and in an aspect of the present disclosure, an object of the present disclosure is to provide a device for displaying an object in a construction site with XR content without using a marker.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided an electronic device of wearable form worn on a user's head and outputting XR content in front of the user including: a sensing unit including at least one sensor; a display unit; and a processor configured to: map BIM data of a construction site in which the user is located to a space within a user's field of view based on sensing information sensed and obtained from the sensing unit, control such that the XR content corresponding to a target is displayed on the display unit, based on a call signal of the target in relation to the construction site being included in a voice-based input signal received from the sensing unit.

Furthermore, the processor may convert the voice-based input signal to a text based on speech-to-text (STT) technology and determine the target based on the converted text.

Furthermore, the processor may calculate a degree of relationship between at least one object in the user's field of view and the target based on a preconfigured criterion and determine an object of which calculated degree of relationship is highest to be related to the target among the objects.

Furthermore, the processor may determine a discrimination view within the user's field of view, calculate a degree of relationship between at least one object in the discrimination view and the target based on the preconfigured criterion, and determine an object of which calculated degree of relationship is highest to be related to the target among the objects.

Furthermore, based on the sensing information for a motion gesture of the user being included in the sensing information, the processor may determine the target based on the motion gesture and the call signal included in the sensing information.

Furthermore, the processor may recognize a viewing direction and a viewing angle of the user based on the sensing information and map the BIM data to the space within the user's field of view based on the recognized viewing direction and viewing angle.

Furthermore, the sensing unit may include a camera for photographing a front of the electronic device, and the processor may determine the target based on the call signal and the photographed image of the camera.

Furthermore, the processor may generate the XR content based on the BIM data of the target and display the generated XR content on an area corresponding to the target on the display unit.

Furthermore, the sensing unit may include an inclination sensor, and the processor may correct the generated XR content based on the recognized viewing direction and viewing angle, and an inclination value obtained from the inclination sensor.

Furthermore, the processor may calculate a moving direction of the user in the construction site based on the sensing information and anticipate a next target according to a movement of the user based on the calculated moving direction.

Furthermore, the processor may generate a list of the targets which are expected to be called by the user in the BIM data based on a category of the called target.

Furthermore, the processor may generate an anticipated moving path of the user in the construction site based on the generated list.

Furthermore, the processor may generate the list and the anticipated moving path based on a control signal of the user which is input for the category of the called target and the XR content of the called target.

To accomplish the above-mentioned objects, according to another aspect of the present disclosure, there is provided a server for outputting XR content to an electronic device of wearable form worn on a user's head including: a communication unit configured to communicate with the electronic device; and a processor configured to: map BIM data of a construction site in which the user is located to a space within a user's field of view based on sensing information obtained from a sensing unit of the electronic device and received through the communication unit, control such that the XR content corresponding to a target is transmitted to the electronic device and displayed on a display unit, based on a call signal of the target in relation to the construction site being included in a voice-based input signal received from the electronic device.

To accomplish the above-mentioned objects, according to another aspect of the present disclosure, a method performed by an electronic device of wearable form worn on a user's head and outputting XR content in front of the user including: receiving sensing information sensed and obtained from a sensing unit including at least one sensor; mapping BIM data of a construction site in which the user is located to a space within a user's field of view based on the sensing information; and displaying the XR content corresponding to a target on the display unit, based on a call signal of the target in relation to the construction site being included in a voice-based input signal received from the sensing unit.

Furthermore, the step of displaying the XR content may further include: calculating a degree of relationship between at least one object in the user's field of view and the target based on a preconfigured criterion, and determining an object of which calculated degree of relationship is highest to be related to the target among the objects.

Furthermore, the step of calculating the degree of relationship may further include: determining a discrimination view within the user's field of view; and calculating a degree of relationship between at least one object in the discrimination view and the target based on the preconfigured criterion.

Furthermore, the step of displaying the XR content may include: generating the XR content based on the BIM data of the target; and displaying the generated XR content on an area corresponding to the target on the display unit.

Furthermore, the sensing unit may include an inclination sensor, and the step of generating the XR content may further include correcting the generated XR content based on a viewing direction and a viewing angle of the user, and an inclination value obtained from the inclination sensor.

Furthermore, after the step of displaying the XR content, the method may further include generating a list of the targets which are expected to be called by the user in the BIM data based on a category of the called target.

Besides the above, a computer program stored in a computer-readable recording medium for implementing the present disclosure may be further provided.

Besides the above, a computer-readable recording medium recording a computer program for implementing the present disclosure may be further provided.

DETAILED DESCRIPTION

Figure 1:
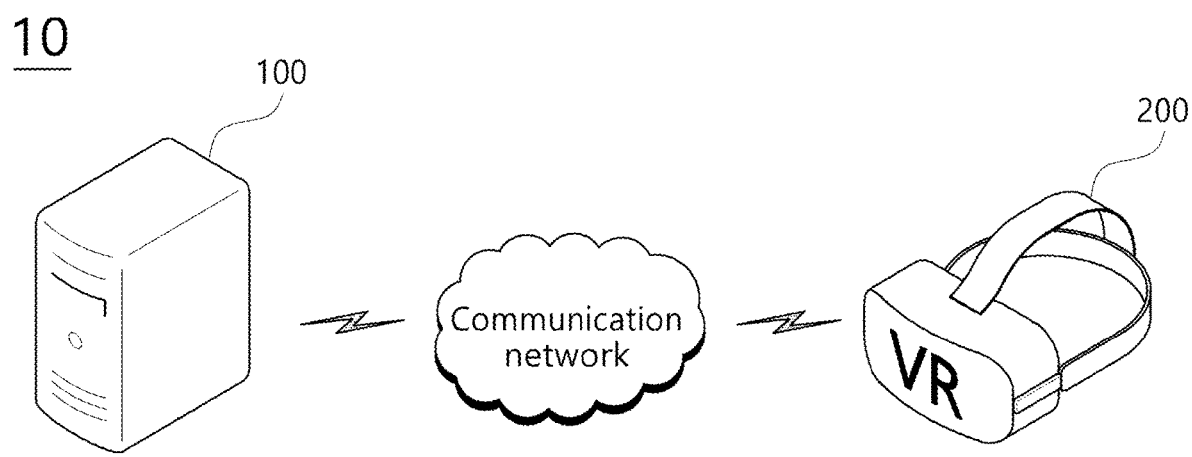
FIG. 1 is a block diagram illustrating a system for displaying XR content according to an embodiment of the present disclosure.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network. Furthermore, when a certain part "includes" a certain element, other elements are not excluded unless explicitly described otherwise, and other elements may in fact be included.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

In description of the present disclosure, 'a virtual reality server 100 and an electronic device according to the present disclosure' includes all various apparatuses capable of executing operational management and providing the operational management results to a user. For instance, the virtual reality server 100 and the electronic device according to the present disclosure may include all of a computer, a server device 100, and a portable terminal, or may be configured to have any form of the computer, the server device 100, and the portable terminal.

Here, the computer may include, for example, a notebook computer equipped with a web browser, a desktop, a laptop, a tablet PC, a slate PC, and the like.

The server device 100 is a server to process information by performing communication with an external device, and may include an application server 100, a computing server 100, a database server 100, a file server 100, a game server 100, a mail server 100, a proxy server 100, a web server 100, and the like.

The portable terminal is a wireless communication device providing portability and mobility, and includes all kinds of handheld-based wireless communication devices, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro), a smartphone, and the like, and a wearable device, such as a watch, a ring, a bracelet, an ankle bracelet, a necklace, glasses, contact lenses, or a Head-Mounted Device (HMD).

Functions related to artificial intelligence according to the present disclosure are operated through a processor and a memory. In this instance, one or multiple processors may be general processors such as CPUs, APs, digital signal processors (DSPs) and the like, graphics-specific processors such as GPUs, and vision processing units (VPU), or artificial intelligence-specific processors such as NPUs. The one or multiple processors perform controlling to process input data according to a predefined operational rule or artificial intelligence model pre-stored in the memory. Alternatively, in a case in which the one or multiple processors are artificial intelligence-specific processors, the artificial intelligence-specific processors may be designed with a hardware structure optimized for processing a specific artificial intelligence model.

It is characterized that the predefined operational rule or the artificial intelligence model is created through learning. Here, being "created through learning" means that a basic artificial intelligence model learns multiple pieces of learning data through a learning algorithm using multiple pieces of learning data to create a predefined operational rule or artificial intelligence model set to execute desired characteristics (or objectives). Such learning may be carried out within a device in which the artificial intelligence according to the present disclosure is executed, may be carried out through a server 100 and/or a system 10. For instance, the learning algorithm includes supervised learning, unsupervised learning, semi-supervised learning, and reinforcement learning, but is not limited thereto.

The artificial intelligence model may include a plurality of neural network layers. Each of the neural network layers includes a plurality of weight values and carries out neural network operations through the calculation between the operation results of the previous layers and the plurality of weight values. The plurality of weight values of the plurality of neural network layers may be optimized based on the learning results of the artificial intelligence model. For instance, during the learning process, the plurality of weight values may be updated so that loss values or cost values obtained from the artificial intelligence model decrease or are minimized. The artificial neural network may include a Deep Neural Network (DNN). The deep neural network may be, for example, a Convolutional Neural Network (CNN), a Deep Neural Network (DNN), a Recurrent Neural Network (RNN), an Restricted Boltzmann Machine (RBM), a Deep Belief Network (DBN), a Bidirectional Recurrent Deep Neural Network (BRDNN), or deep Q-Networks, but are not limited thereto.

According to an exemplary embodiment of the invention, the processor may implement artificial intelligence. Artificial intelligence refers to a machine learning method based on an artificial neural network which simulates human biological neurons to enable machine learning. Artificial intelligence methodologies may be categorized into supervised learning that provides both input data and output data as training data according to learning methods such that a solution (output data) to a problem (input data) is predetermined, unsupervised learning that provides only input data without output data such that a solution (output data) to a problem (input data) is not predetermined, and reinforcement learning in which rewards are provided from the external environment each time an action is taken in the current state and learning proceeds in a direction to maximize the rewards. Additionally, the artificial intelligence methodologies may also be differentiated based on the architectures, which are structures of the learning model. Widely used deep learning architectures are classified into a Convolutional Neural Network (CNN), a Recurrent Neural Network (RNN), a transformer, and a Generative Adversarial Network (GAN).

The server 100 and the electronic device 200 may include an artificial intelligence model. The artificial intelligence model may be a single artificial intelligence model or may be implemented with multiple artificial intelligence models. The artificial intelligence model may be comprised of a neural network or artificial neural network, and may include a statistical learning algorithm which simulates biological neurons in machine learning and cognitive science. The neural network may refer to the entire model with problem-solving ability by artificial neurons (nodes), which forms a network through coupling of synapses, changing the coupling strength of the synapses through learning. Neurons in the neural network may include combinations of weight values or biases. The neural network may include one or more layers having one or more neurons or nodes. For example, the apparatus may include an input layer, a hidden layer, and an output layer. The neural network constituting the apparatus may change the weight values of neurons through learning to infer an output to be predicted from an arbitrary input.

The processor may create a neural network, train or learn the neural network, or perform operation based on received input data, and generate an information signal based on the operation results, or retrain the neural network. Models of the neural network may include various types of models, for instance, a Convolution Neural Network (CNN) such as a GoogleNet, an AlexNet, and a VGG Network, a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a deconvolution network, a Deep Belief Network (DBN), a Restricted Boltzman Machine (RBM), a fully convolutional network, a Long Short-Term Memory (LSTM) network, a classification network, and the like, but are not limited thereto. The processor may include one or more processors to execute operations according to the models of the neural network. For example, the neural network may include the deep neural network.

The neural network may include a Convolutional Neural Network (CNN), a Recurrent Neural Network (RNN), a perceptron, a multilayer perceptron, a Feed Forward (FF), a Radial Basis Function Network (RBFN), a Deep Feed Forward (DFF), a Long Short Term Memory (LSTM), a Gated Recurrent Unit (GRU), an Auto Encoder (AE), a Variational Auto Encoder (VAE), a Denoising Auto Encoder (DAE), a Sparse Auto Encoder (SAE), a Markov Chain (MC), a Hopfield Network (HN), a Boltzmann Machine (BM), a Restricted Boltzmann Machine (RBM), a Deep Belief Network (DBN), a Deep Convolutional Network (DCN), a Deconvolutional Network (DN), a Deep Convolutional Inverse Graphics Network (DCIGN), a Generative Adversarial Network (GAN), a Liquid State Machine (LSM), an Extreme Learning Machine (ELM), an Echo State Network (ESN), a Deep Residual Network (DRN), a Differentiable Neural Computer (DNC), a Neural Turing Machine (NTM), a Capsule Network (CN), a Kohonen Network (KN), and an Attention Network (AN). However, it will be understood by those skilled in the art that the neural network is not limited thereto and may include any type of neural network.

In accordance with an exemplary embodiment of the present disclosure, the processor may utilize various artificial intelligence structures and algorithms, for example, a Convolution Neural Network (CNN) such as a GoogleNet, an AlexNet, a VGG Network, a Region with Convolution Neural Network (R-CNN), a Region Proposal Network (RPN), a Recurrent Neural Network (RNN), a Stacking-based Deep Neural Network (S-DNN), a State-Space Dynamic Neural Network (S-SDNN), a Deconvolution Network, a Deep Belief Network (DBN), a Restricted Boltzmann Machine (RBM), a fully convolutional network, a Long Short-Term Memory (LSTM) network, a classification network, a generative modeling, an explainable AI, a continual AI, a representation learning, an AI for material design, a BERT for natural language processing, an SP-BERT, an MRC/QA, a text analysis, a dialog system, a GPT-3, a GPT-4, a visual analytics for vision processing, a visual understanding, a video synthesis, a ResNet (Residential Energy Services Network), an anomaly detection for data intelligence, a prediction, a time-series forecasting, an optimization, a recommendation, a data creation and more, but is not limited thereto. Hereinafter, embodiments of the present disclosure will be described in detail with reference to the accompanying drawings.

FIG. 1 is a block diagram illustrating a system 10 for displaying XR content according to an embodiment of the present disclosure.

Referring to FIG. 1, the system 10 for displaying XR content according to an embodiment of the present disclosure includes a server 100 and an electronic device 200.

However, in some of the embodiments, the system 10 may include a smaller number of elements or a larger number of elements in comparison with the elements shown in FIG. 1.

In one example, the electronic device 200 may refer to a device worn by a user (e.g., a worker or a manager) in a construction site and display XR content for providing various types of information to a user in the augmented reality scheme.

The electronic device 200 may be applied to a virtual reality device in the form of goggle worn by a user as shown in FIG. 1.

More specifically, the electronic device 200 is referred to an electronic device of wearable form worn by a user's head.

The server provides XR content to the electronic device of wearable form worn by a user's head and displays the XR content on the electronic device.

The server 100 may map BIM data of a construction site to a space within a user's field of view based on sensing information sensed from a sensing unit 220 of the electronic device 200 and, when a request signal to display a specific target in the construction site is received from the electronic device 200, transmit and display the XR content corresponding to the requested target on the electronic device 200.

In one embodiment of the present disclosure, the place in which the user visits, checks, and manages with wearing the electronic device 200 is not limited to a specific position, but a construction site is described as an example in the following embodiments.

Figure 2:
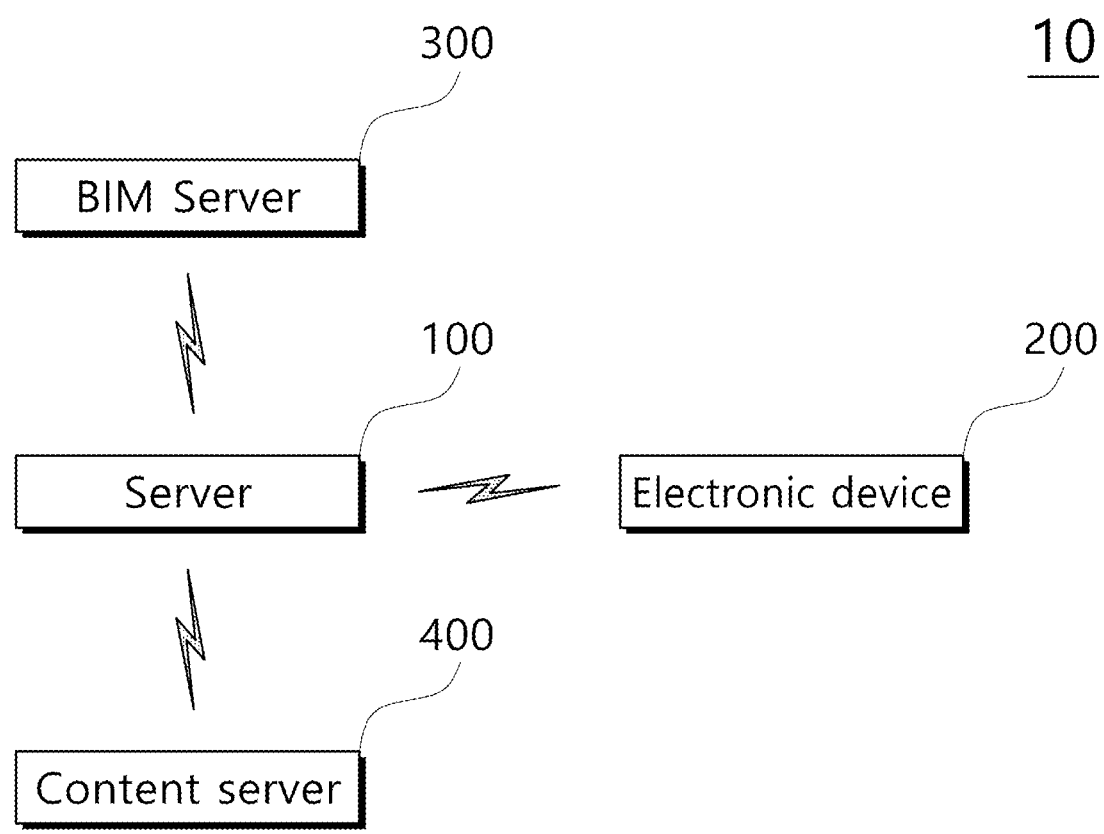
FIG. 2 is a diagram illustrating that a BIM server and a content server are separately disposed in the system shown in FIG. 1.

FIG. 2 is a diagram illustrating that a BIM server 300 and a content server 400 are separately disposed in the system 10 shown in FIG. 1.

Referring to FIG. 2, the system 10 according to an embodiment of the present disclosure may further include the BIM server 300 that stores BIM data of a construction site and the content server 400 in which XR content is stored to display through the electronic device 200.

The server 100 may store an instruction, algorithm, an artificial intelligence model, and the like for an operation of the processor in a storage, and the BIM data and the XR content may be stored in a separate cloud server 100.

FIG. 2 shows that the server 100 communicates with the BIM server 300 and the content server 400 and receives the BIM data or the XR content, but the present disclosure is not limited thereto, and the electronic device 200 may communicate with the BIM server 300 and the content server 400 directly and receive the BIM data or the XR content.

In the embodiment of the present disclosure, the XR content displayed on the electronic device may be at least one of AR content, VR content, or MR content.

Figure 3:
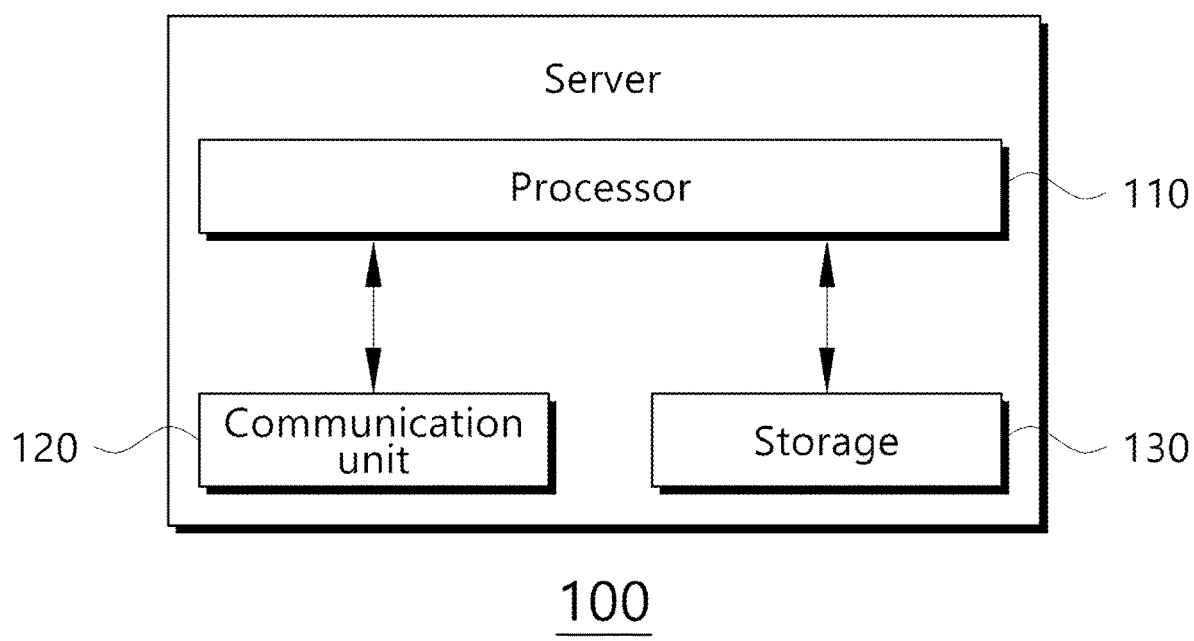
FIG. 3 is a block diagram of the server according to an embodiment of the present disclosure.

FIG. 3 is a block diagram of the server 100 according to an embodiment of the present disclosure.

Figure 4:
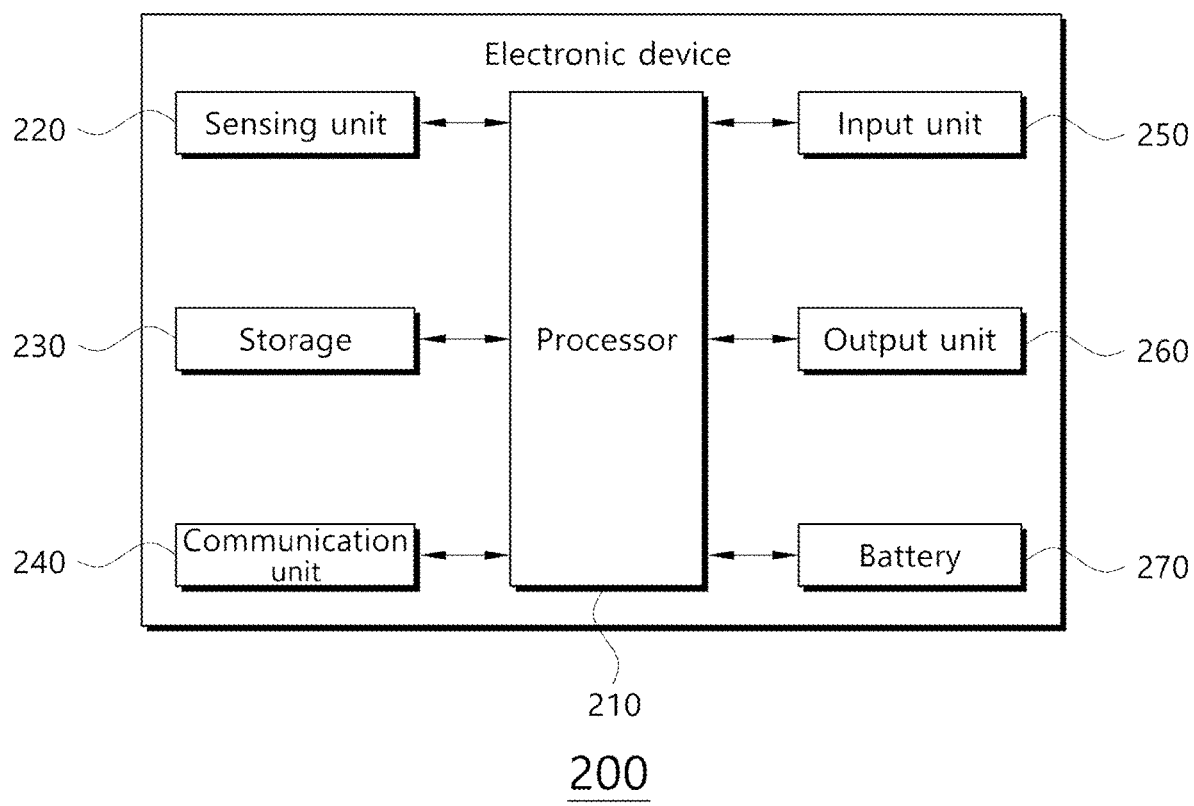
FIG. 4 is a block diagram of the electronic device according to an embodiment of the present disclosure.

FIG. 4 is a block diagram of the electronic device 200 according to an embodiment of the present disclosure.

Referring to FIG. 3, the server 100 that displays XR content according to an embodiment of the present disclosure includes a processor 110, a communication unit 120, and a storage 130.

However, in some of the embodiments, the server 100 may include a smaller number of elements or a larger number of elements in comparison with the elements shown in FIG. 3.

Referring to FIG. 4, the electronic device 200 according to an embodiment of the present disclosure includes a processor 210, a sensing unit 220, a storage 230, a communication unit 240, an input unit 250, an output unit 260, and a battery 270.

However, in some of the embodiments, the electronic device 200 may include a smaller number of elements or a larger number of elements in comparison with the elements shown in FIG. 4.

In the embodiment of the present disclosure, the processor 210 of the electronic device 200 may perform at least a part of the operations performed by the processor 110 of the server 100 instead.

Hereinafter, the general functions of the processor 110 or 210, the storage 130 or 230, and the communication unit 120 or 240 are described.

The processor 110 or 210 may be implemented with the server 100, the storage 130 or 230 for storing algorithm for controlling operations of the elements in the electronic device 200 or storing data for the program that reproduces the algorithm, and at least one processor 110 or 210 for performing the operation described above by using the data stored in the storage 130 or 230. In this case, the storage 130 or 230 and the processor 110 or 210 may be implemented in separate chips, respectively. Alternatively, the storage 130 or 230 and the processor 110 or 210 may be implemented in a single chip.

In addition, the processor 110 or 210 may control either one or a plurality of the elements described above to implement the various embodiments of the present disclosure described in the following drawing on the server 100 and the electronic device 200.

The processor 110 or 210 may control the overall operations of the server 100 and the electronic device 200 in addition to the operation in relation to the application program. The processor 110 or 210 may provide or process information or functions proper to a user by processing signals, data, information, and the like which are input or output through the elements described above or executing the application program stored in the storage.

In addition, the processor 110 or 210 may control at least a part of the elements of the server 100 and the electronic device 210 to execute the application program stored in the storage. Furthermore, the processor 110 or 210 may combine and operate at least two or more elements included in the server 100 and the electronic device 200 to execute the application program.

The communication unit 120 or 240 may include at least one module for connecting one or more of the virtual reality server 100 and the electronic device 200 to a network.

The communication unit 120 or 240 may include one or more elements that enable to communicate with an external device, for example, at least one of a broadcasting reception module, a wired communication module, a wireless communication module, a short-range communication module, or location information module.

The wired communication module may include various cable communication modules such as USB (Universal Serial Bus), HDMI (High Definition Multimedia Interface), DVI (Digital Visual Interface), RS-232 (recommended standard 232), power line communication, or POTS (plain old telephone service) as well as various wired communication modules such as Local Area Network (LAN) module, Wide Area Network (WAN) module or Value Added Network (VAN) module.

The wireless communication module may include a wireless communication module that supports various wireless communication schemes such as GSM (global System for Mobile Communication), CDMA (Code Division Multiple Access), WCDMA (Wideband Code Division Multiple Access), UMTS (universal mobile telecommunications system), TDMA (Time Division Multiple Access), LTE (Long Term Evolution), 4G, 5G, 6G, and the like as well as a Wi-Fi module and a Wireless broadband module.

The wireless communication module may include a wireless communication interface including an antenna and a transmitter for transmitting communication signals. In addition, the wireless communication module may further include a signal conversion module for modulating digital control signals output from the processor 110 or 210 to wireless signals in an analogue format through a wireless communication interface under the control of the processor 110 or 210.

The short-range communication module is designed for a short-range communication and may support the short-range communication by using at least one of Bluetooth™, RFID (Radio Frequency Identification), Infrared Data Association (IrDA), UWB (Ultra-Wideband), ZigBee, NFC (Near Field Communication), Wi-Fi (Wireless-Fidelity), Wi-Fi Direct, or Wireless USB (Wireless Universal Serial Bus) technologies.

The storage 130 or 230 may store data that support various functions of the server 100 and the electronic device 200. The storage 130 or 230 may store various application programs or applications executed in the server 100 and the electronic device 200, and data and commands to operate the server 100 and the electronic device 200. Meanwhile, the application program may be stored in the storage, installed in the device, and executed to perform operations (functions) by the processor 110 or 210.

The storage 130 or 230 may store data that support various functions of the server 100 and the electronic device 200, programs to operate the processor 110 or 210, input/output data (e.g., music file, a still image, video, etc.), application programs or applications executed in the server 100 and the electronic device 200, and data and commands to operate the server 100 and the electronic device 200. At least a part of the application programs may be downloaded from the external server 100 through a wireless communication.

The storage 130 or 230 may include at least a type of storage medium of flash memory type, hard disk type, SSD (Solid State Disk) type, SDD (Silicon Disk Drive) type, multimedia card micro type, memory of card type (e.g., SD or XD memory, etc.), RAM (random access memory), SRAM (static random access memory), ROM (read-only memory), EEPROM (electrically erasable programmable read-only memory), PROM (programmable read-only memory, magnetic memory, magnetic disk, and optical disk. Furthermore, the storage 130 or 230 may be separated from the server 100 and the electronic device 200 but may be database connected in wired or wireless manner.

The storage 130 or 230 may be provided with a plurality of processes for the electronic device 200 and the virtual reality server 100.

The input unit 250 is designed to input image information (or signal), audio information (or signal), data, or information input by a user and may include at least one of at least one camera, at least one microphone, or a user input unit 250. The voice data or the image data collected from the input unit 250 may be analyzed and processed by a control command of a user.

The input unit 250 is designed to receive information from a user, and when the information is input through the input unit 250, the processor may control the operation of the server 100 and the electronic device 200 corresponding to the input information. The input unit 250 may include a hardware type physical key (e.g., a button, a dome switch, a jog wheel, a jog switch, etc. located at least one of a front surface, a rear surface, or a side surface of the server 100 and the electronic device 200) and a software type touch key. In one example, the touch key may be implemented with a virtual key, a soft key, or a visual key displayed on a display unit of a touch screen type through a software process or a touch key disposed except the touch screen part. Meanwhile, the virtual key may have various shapes and displayed on the touch screen, for example, a graphic, a text, an icon, a video, or a combination thereof.

The output unit 260 is designed to generate an output in relation to visual, auditory, or tactile sense and may include at least one of a display unit, a sound output unit 260, a Haptic module, or an optical output unit 260. The display unit may have a mutual layered structure or integral structure with a touch sensor and implement a touch screen. The touch screen may function as a user input unit 250 that provides an input interface among the server 100, the electronic device 200, and the user, and simultaneously, provide an output interface among the server 100, the electronic device 200, and the user.

The output unit 260 may include a display unit.

The display unit of the electronic device 200 may be a transparent display.

A user may watch the front real world in a state of wearing the electronic device 200. When a call signal is input to call a target needed to be checked or identified, at least one XR content for the call target of the real world is displayed on a user's field of view of the transparent display, and the user may identify the real world and the XR content of the target together.

The display unit may display (output) information processed in the server 100 and the electronic device 200. For example, the display unit may display the execution screen information of an application program (e.g., application) executed in the server 100 and the electronic device 200 or UI (User Interface) and GUI (Graphic User Interface) information according to the execution screen information.

In the embodiment of the present disclosure, the output unit 260 may further include another output means such as a voice output means in addition to the visual output means described above.

The sound output unit may output audio data received through the communication unit or stored in the storage or sound signals in relation to the function performed in the server 100 and the electronic device 200. The sound output unit may include a receiver, a speaker, a buzzer, and the like.

The battery 270 is a means for supplying power to the electronic device 200.

Figure 5:
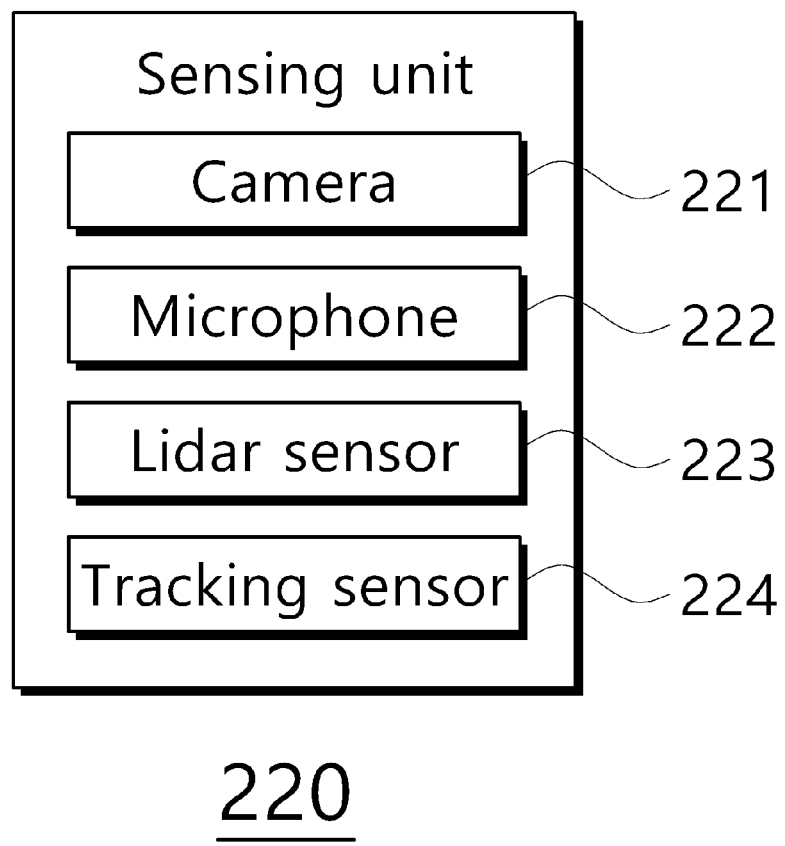
FIG. 5 is a diagram illustrating the sensing unit of the electronic device.

FIG. 5 is a diagram illustrating the sensing unit 220 of the electronic device 200.

Any means capable of obtaining sensing information by sensing a user or a surrounding environment may be applied to the sensing unit 220, and the sensing unit 220 may include a camera, a microphone, a lidar sensor, and a tracking sensor as shown in FIG. 5.

However, in some of the embodiments, the sensing unit 220 may include a smaller number of elements or a larger number of elements in comparison with the elements shown in FIG. 5.

The sensing unit 220 may sense at least one of information of the server 100 and the electronic device 200, environmental information surrounding the server 100 and the electronic device 200, or user information. The processor may control the execution or operation of the server 100 and the electronic device 200 based on the sensing signal or perform the data processing, function, or operation in relation to the application program installed in the server 100 and the electronic device 200.

The sensing unit 220 may include at least one of a proximity sensor, an illumination sensor, a touch sensor, an acceleration sensor, a magnetic sensor, a G-sensor, a gyroscope sensor, a motion sensor, an RGB sensor, an IR (infrared) sensor, a finger scan sensor, an ultrasonic sensor, an optical sensor (e.g., camera), a microphone, an environmental sensor (e.g., a barometer, a hygrometer, a thermometer, a radioactive detection sensor, a heat detection sensor, a gas detection sensor, etc.), or a chemical sensor (e.g., a healthcare sensor, a biometric sensor, etc.). Meanwhile, the server 100 and the electronic device 200 may combine and utilize the information sensed by at least two sensors among the sensors.

The camera may process an image frame such as a still image or a video image obtained by an image sensor in a photographing mode. The processed image frame may be displayed on the display unit or stored in the storage.

The electronic device 200 may include at least one camera. The electronic device 200 may include a plurality of cameras and include a first camera for photographing a front of a user, a second camera for photographing a rear of a user, and a third camera for photographing a user's eyeball.

In some of the embodiments, the third camera may refer to a tracking sensor.

A microphone is a device that converts a voice to an electronic signal, and the processor detects whether a voice signal is present in relation to a control command from the voice signal which is input and received from the microphone.

The lidar (Light Detection and Ranging) sensor is referred to a device that measures a distance and a direction by using a laser, and the processor may measure the surrounding environment and the position of a user more accurately based on the sensing information sensed by the lidar sensor.

In some of the embodiments, the processor 110 or 210 may identify the position of a user by using the sensing information of the lidar sensor and the sensing information of the camera.

The electronic device 200 may apply an open-type lidar that senses by emitting a laser in a 360-degree direction or a closed lidar that senses by emitting a laser in a specific direction.

The tracking sensor is referred to a sensor that provides an immersive virtual environment to a user and tracks the user's location and direction or the user's gaze.

The tracking sensor may apply a sensing device such as a camera, an IMU (Inertial Measurement Unit) sensor, and a radar.

The IMU (Inertial Measurement Unit) sensor may apply a device such as an accelerometer or a gyroscope.

Figure 6:
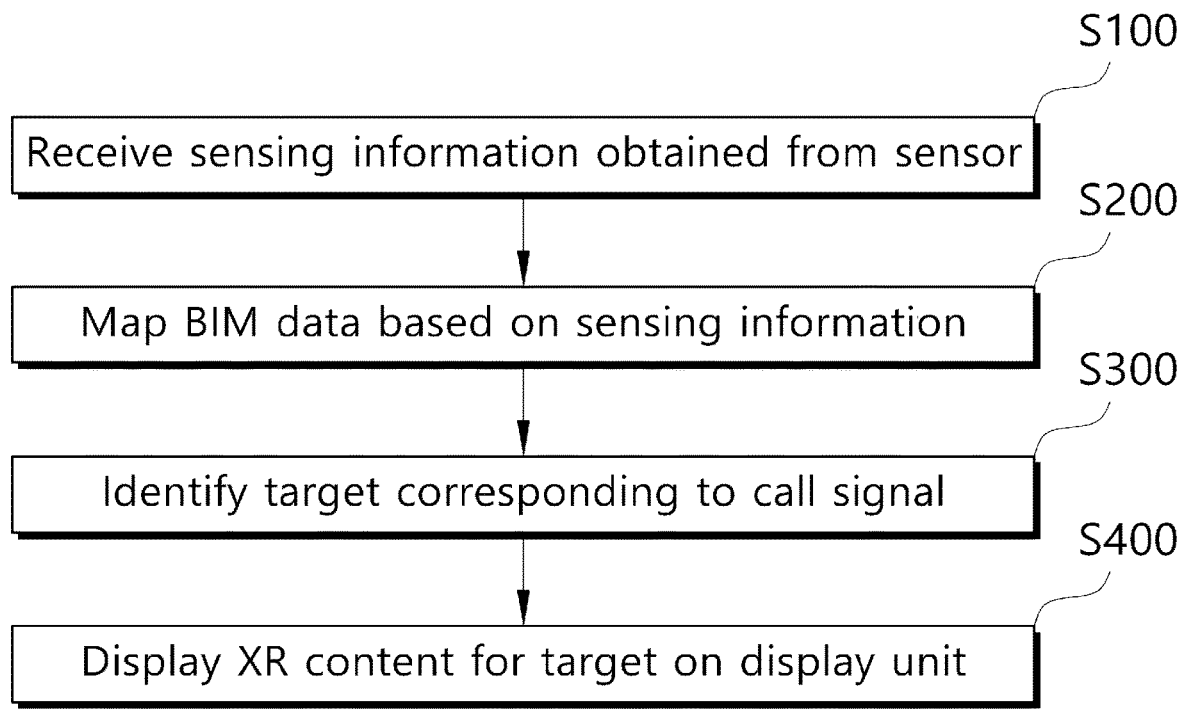
FIG. 6 is a flowchart illustrating a method for displaying XR content according to an embodiment of the present disclosure.

FIG. 6 is a flowchart illustrating a method for displaying XR content according to an embodiment of the present disclosure.

FIGS. 7 to 12 are exemplary diagrams for describing the device, method, and program for displaying XR content according to an embodiment of the present disclosure.

Hereinafter, the device, method, and program for displaying XR content according to an embodiment of the present disclosure are described in detail with reference to FIG. 6 and the other drawings.

The server 100 or the electronic device 200 receives sensing information obtained from the sensing unit 220 (step S100).

In the case of the operation by the server 100, the processor 110 of the server 100 receives the sensing information through the communication unit 120.

In the case of the operation by the electronic device 200, the processor 210 of the electronic device 200 receives the sensing information.

In this case, the server 100 or the electronic device 200 may receive the sensing information in real time or in a predetermined cycle.

In the embodiment of the present disclosure, the sensing information may refer to data sensed by at least one sensor device included in the sensing unit 220, and the processor 110 or 210 may distinguish different types of sensing information depending on a use.

The server 100 or the electronic device 200 maps a space within a user's field of view wearing the electronic device 200 to BIM data based on the sensing information received in step S100 (step S200).

More specifically, the processor 110 or 210 may map a surrounding space of the user that wears the electronic device 200 to the BIM data for the space.

In the case of the operation by the server 100, the processor 110 of the server 100 maps the space within a user's field of view wearing the electronic device 200 to the BIM data for the space in which the user is located based on the sensing information received in step S100.

In the case of the operation by the electronic device 200, the processor 210 of the electronic device 200 maps the space within a user's field of view wearing the electronic device 200 to the BIM data for the space in which the user is located based on the sensing information received in step S100.

The processor 110 or 210 may map the space within a user's field of view to the BIM data for the space in which the user is positioned in real time or in a predetermined time interval. In one embodiment, the processor 110 or 210 may determine a mapping cycle by considering a communication speed or a communication state.

In the case that a signal for calling a target is included in the input signal received in the server 100 or the electronic device 200, the server 100 or the electronic device 200 identifies a target corresponding to the call signal (step S300).

The processor displays at least one XR content for the target identified in step S300 on the electronic device 200 (step S400).

Conventionally, a marker (e.g., QR code) is set to mark XR content in a construction site, and when a user recognizes the marker through the electronic device 200, the content linked with the marker is displayed on the electronic device 200.

However, when the construction site is complex and various processes are carried out, it is difficult to attach the marker in accordance with the changing construction site, and in the case of a large-scale construction site, it is sometimes impossible to attach the markers.

Accordingly, in the system 10 for displaying XR content according to an embodiment of the present disclosure, a worker (user) identifies BIM data (construction design data) on a specific location without a marker and calls a coordinate or code value of the corresponding location by voice, and accordingly, calls at least one XR content for the corresponding location.

In an embodiment of the present disclosure, to identify and search the BIM data for the call signal, code values corresponding to respective call signals are set in the BIM data.

Accordingly, when a call signal for calling a specific target is detected, the processor 110 or 210 may encode the call signal based on a preconfigured algorithm and load the BIM data corresponding to the code in the BIM data.

In the case of the operation by the server 100, when a signal for calling a target is included in the input signal received from the electronic device 200 through the communication unit 120, the processor 110 of the server 100 identifies the target corresponding to the call signal.

In the case of the operation by the electronic device 200, when a signal for calling a target is included in the input signal, the processor 210 of the electronic device 200 identifies the target corresponding to the call signal.

In the embodiment of the present disclosure, the input signal for calling a target may be an input signal for at least one category. For example, the input signal may include a signal for at least one category of a voice, a gesture, or a gaze.

Figure 7:
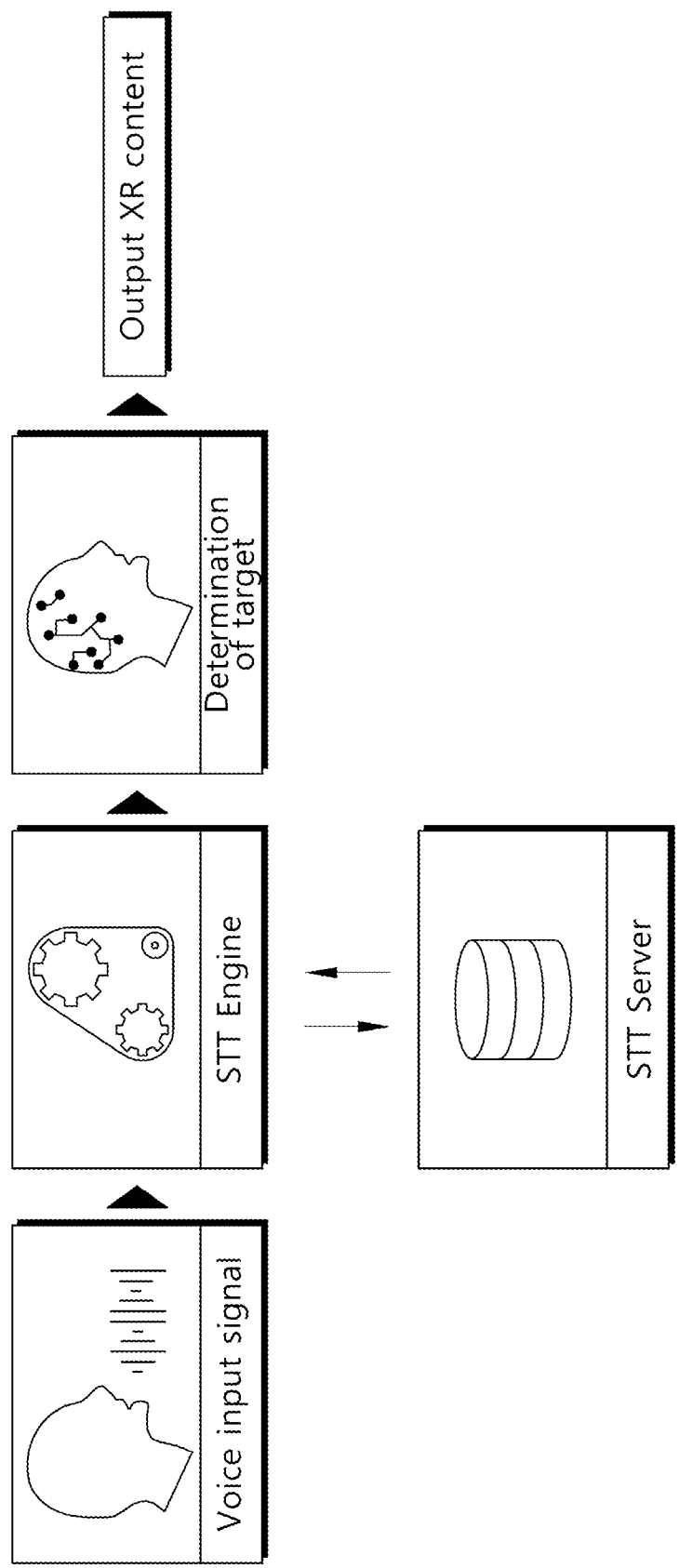
FIGS. 7 and 8 are exemplary diagrams for describing a determination of a target indicated by a voice-based input signal and an output of XR content for the target to the electronic device.
Figure 8:
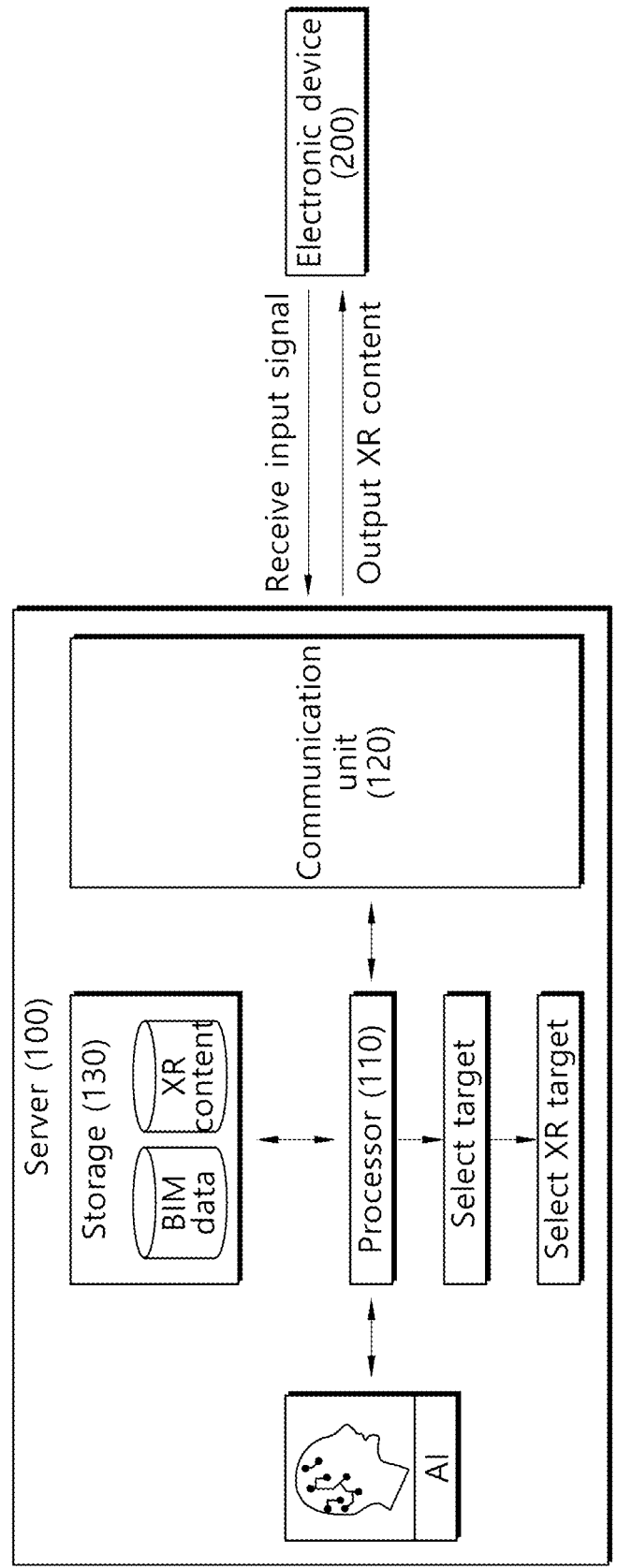

FIGS. 7 and 8 are diagrams for describing a determination of a target identified from a voice-based input signal and an output of XR content for the target to the electronic device 200.

The processor 110 or 210 may use Cleansing, Tokenization, Stopword removal, and Stemming/Lemmatization for the text preprocessing (normalization).

Cleansing refers to a task of removing an unnecessary letter or sign that may interfere with text analysis in advance.

Tokenization refers to a sentence tokenization for separating sentences from a document and a word tokenization for separating words into a token from a sentence.

Stopword removal refers to a removal of a word that has no significant meaning for analysis.

In the voice recognition, Stemming/Lemmatization is referred to a technique to increase the accuracy of a voice recognition model.

Stemming is referred to a technique for extracting a root. For example, "runs", "running", and "ran" all have the root "run". Stemming may improve the accuracy of the voice recognition model by treating all these words as "run".

Lemmatization is referred to a technique that not only extracts root, but also converts it into the right form in consideration of part of voice. For example, "runs" is the present form of the verb "run", and "running" is the present form of the verb "run". Lemmatization may further improve the accuracy of the voice recognition model by treating all these words as the verb "run".

The processor 110 or 210 of the embodiment of the present disclosure may use Stemming/Lemmatization in the voice recognition as the following method.

The processor 110 or 210 may be used to process voice data used as an input of a voice recognition model.

The processor 110 or 210 may be used to process text data used as an output of a voice recognition model.

Referring to FIG. 7, the processor 110 or 210 analyzes a voice-based input signal based on an STT engine and identifies whether a call signal for calling a specific target is included in the input signal, and when the call signal for the specific target is included in the input signal, output at least one XR content for the target through the electronic device 200.

For example, the processor 110 or 210 may convert the voice-based input signal to a text based on speech-to-text (STT) technology and determine the target based on the converted text.

As shown in FIG. 7, the STT engine separately stored in an STT server may be used.

In this case, the XR content may be applied to at least one of AR content, VR content, or MR content.

In some of the embodiments, the processor 110 or 210 may identify the target indicated by the user accurately by considering the input signal of another category (gesture, gaze, etc.) in addition to the voice-based input signal.

In one embodiment, the sensing unit 220 may further include a voice vibration sensor that may sense whether the user is in a speech state in a vibration scheme.

In the case that the processor 110 or 210 further analyzes a voice of different person in addition to the user wearing the electronic device 200, the analysis accuracy may be degraded or overload occurs, and accordingly, the analysis may be performed by recognizing only the voice of the user wearing the electronic device 200.

For this, the processor 110 or 210 may perform the analysis only for the voice-based input signal which is received in the case that a vibration satisfying a preconfigured condition is detected through the voice vibration sensor.

In one example, the processor 110 or 210 may model a voice of a user and store in the storage 130 or 230 and recognize or distinguish the voice of the user by using the model.

The processor 110 or 210 may analyze a voice of the user. The processor 110 or 210 extracts frequency, amplitude, and temporal characteristics of the user and based on this, stores the learned voice recognition model. Further, the processor 110 or 210 may recognize the voice of the user from the received voice-based input signal.

Figure 9:
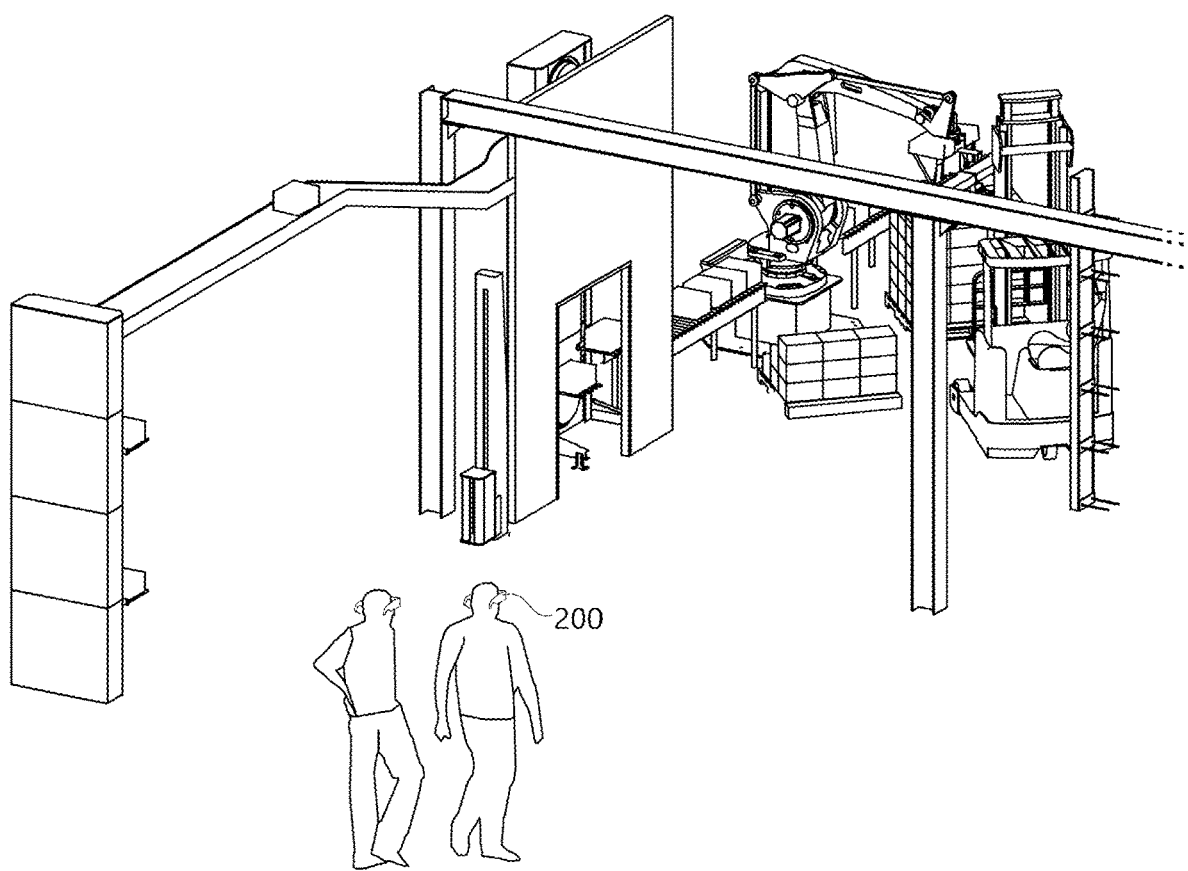
FIG. 9 is a diagram illustrating a user wearing the electronic device and visiting a construction site.

FIG. 9 is a diagram illustrating a user wearing the electronic device 200 and visiting a construction site.

Figure 10:
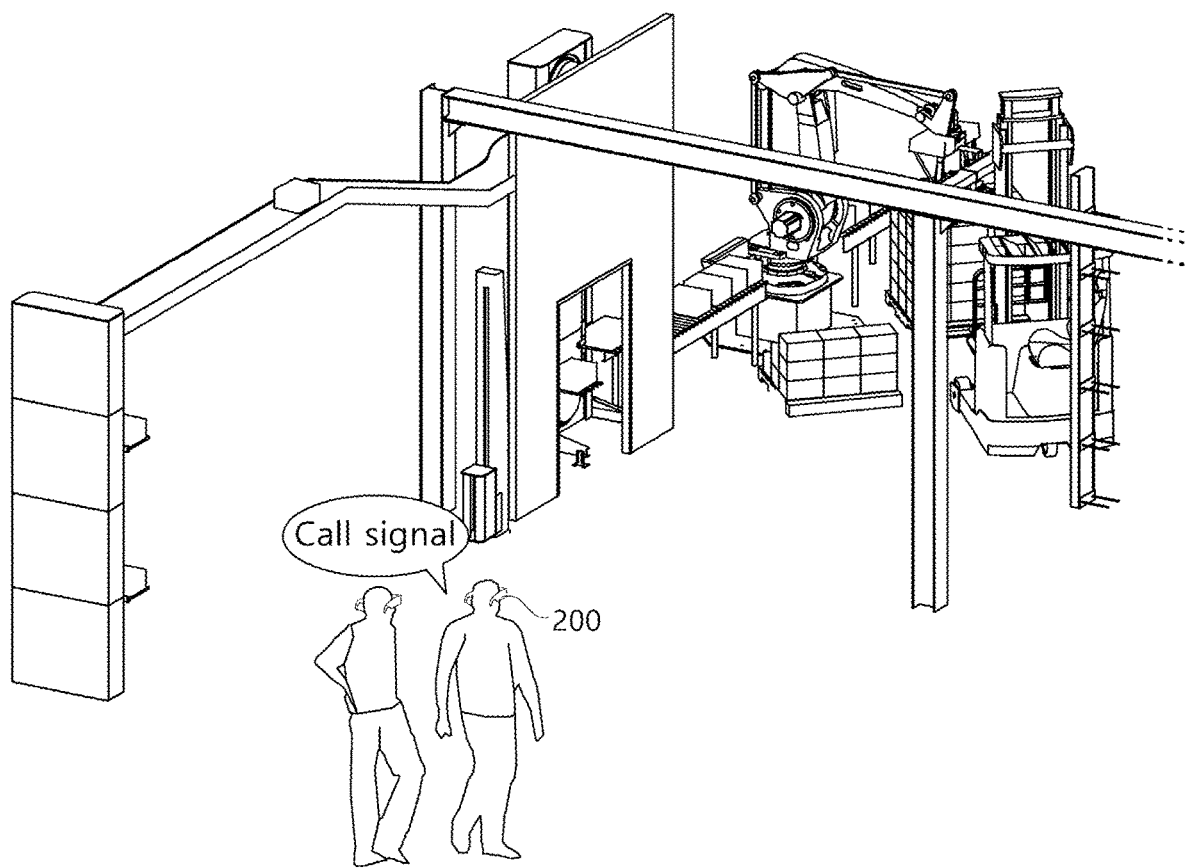
FIG. 10 is a diagram illustrating a user inputting a call signal for calling XR content shown in FIG. 9.

FIG. 10 is a diagram illustrating a user inputting a call signal for calling XR content shown in FIG. 9.

Figure 11:
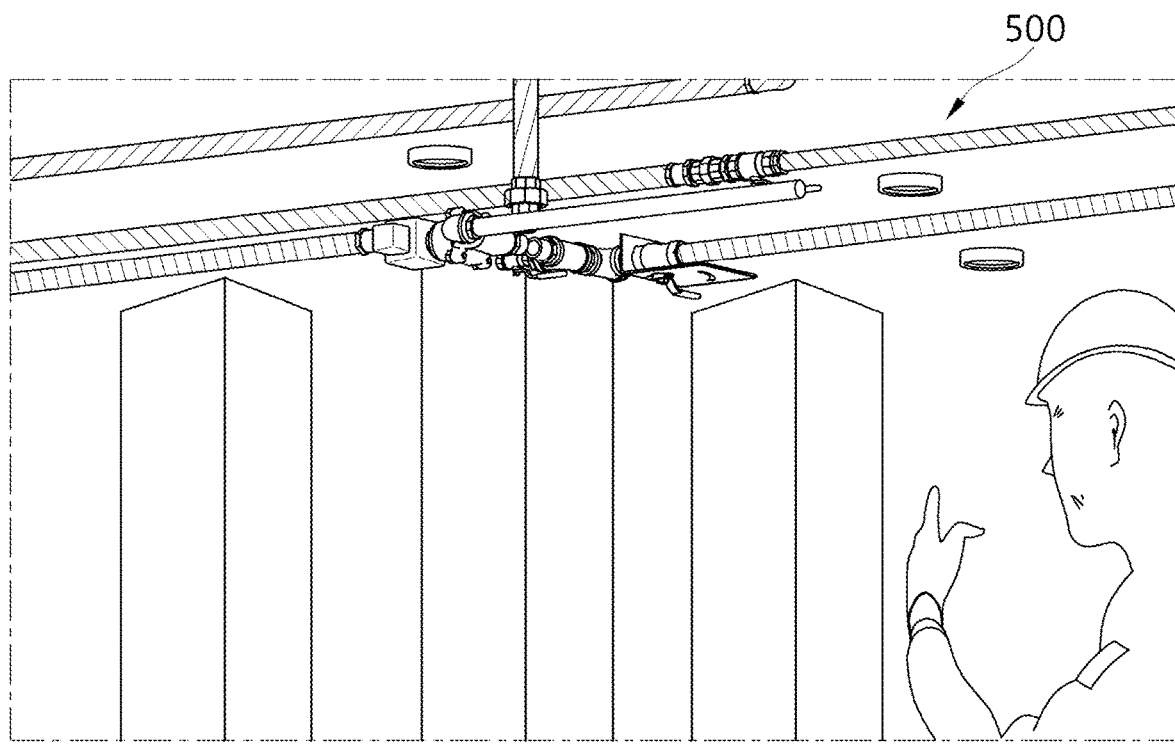
FIG. 11 is a diagram illustrating at least one XR content displayed on the display unit of the electronic device worn by a user by the call signal shown in FIG. 10.

FIG. 11 is a diagram illustrating at least one XR content displayed on the display unit of the electronic device 200 worn by a user by the call signal shown in FIG. 10.

Referring to FIG. 9 and FIG. 10, it is exemplified that the user wearing the electronic device 200 visits a construction site and inputs a call signal for calling the XR content of a specific target.

Further, as shown in FIG. 11, the processor 110 or 210 output at least one XR content 500 through the electronic device 200.

The processor 110 or 210 may use the following methods to improve the determination accuracy for the call target from the received signal.

In one embodiment, the processor 110 or 210 may calculate a degree of relationship between an object in the user's field of view and the call signal and determine the object of which calculated degree of relationship is highest to be related to the target.

In one embodiment, the processor 110 or 210 may determine a call code based on the call signal and select the object which is matched to the call code among the objects in the user's field of view as the target.

In one embodiment, the processor 110 or 210 may determine a shape of the target called by the user based on the call signal and determine the call target based on the degree to which the shape of the object within the user's field of view match.

In one embodiment, the processor 110 or 210 may determine the name of the target called by the user based on the call signal and determine the object having the name to be the call target among the objects in the user's field of view.

In one embodiment, the processor 110 or 210 may determine a category of the target called by the user based on the call signal and determine the object having the category to be the call target among the objects in the user's field of view.

This means that the object anticipated to be called by the user within the user's field of view is determined to be the target, since the probability of calling the object which is not present in the user's field of view is very low.

In this case, the processor 110 or 210 may determine a discrimination view within the user's field of view, calculate a degree of relationship between at least one object in the discrimination view and the target, and determine the object of which calculated degree of relationship is highest to be related to the target.

The discrimination view may refer to the part of a person's view that may distinguish the shape or color of an object, and the discrimination view may be divided into peripheral view and central view.

The peripheral view is an area that occupies about 90 degrees of the field of view, and is an area of roughly identifying a movement or shape of an object. The peripheral view is a part other than the retina's macula. The macula is position in the center of the retina and serves as the central role of view.

The central view is an area that occupies about 10 degrees of the field of view, which may distinguish a detailed shape or color of an object, and the central view is made up of a macula.

The discrimination view plays an important role in a person's visual function. The peripheral view helps to avoid danger or explore a surrounding environment by grasping the location or movement of objects. The central view helps identify objects or search for information by distinguishing detailed shapes or colors of objects.

In other words, since the user is most likely to call an object within the discrimination view within the user's field of view, the processor 110 or 210 may identify the range of the discrimination view within the user's field of view and use it to select the target of the call signal.

In one embodiment, in the case that a gesture of the user is recognized in the received sensing information, the processor 110 or 210 may determine the target indicated by the user based on the recognized gesture and the input signal.

FIG. 11 exemplifies a user gesture that indicates a specific position. The processor 110 or 210 may determine the target that the user is intended to call accurately based on the received voice-based input signal and a direction of the gesture.

For example, the sensing unit 220 may further include a motion sensor that enables to sense a body movement of the user. The motion sensor may be worn on a body part such as a head, a hand, and the like.

The processor 110 or 210 may determine the gesture of the user based on sensing information of the motion sensor.

The processor 110 or 210 may determine the target indicated by the user based on the sensing information of the motion sensor and the call signal of the user.

In one example, the processor 110 or 210 may recognize a viewing direction and a viewing angle of the user based on the sensing information obtained from at least one sensor.

In addition, the processor 110 or 210 may map the BIM data to the space within the user's field of view based on the recognized viewing direction and viewing angle.

The sensing unit 220 includes a first camera for photographing a front of the electronic device 200.

The processor 110 or 210 may determine the call target based on the call signal and the photographed image of the first camera.

As described above, the sensing unit 220 may further include a second camera for photographing a rear of the electronic device 200. In one example, the processor 110 or 210 may map the peripheral space of the user to the BIM data by using the sensing information and the rear photographed image of the second camera together.

In one example, the processor 110 or 210 may identify the rear photographed image of the second camera in a preconfigured time interval and identify the accuracy of the mapping state of the BIM data.

In one example, the processor 110 or 210 may generate at least one XR content based on the BIM data of the call target and display the generated at least one XR content on an area corresponding to the call target on the display unit of the electronic device 200.

The sensing unit 220 may further include an inclination sensor.

In one embodiment, the processor 110 or 210 may correct the generated at least one XR content based on the recognized viewing direction and viewing angle, and an inclination value obtained from the inclination sensor.

When the processor 110 or 210 determines the call target and displays at least one XR content based on the BIM data for the target, in the case that at least one XR content is displayed as it is, a sense of separation from the facility in the real world within the user's field of view may exist. Accordingly, the processor 110 or 210 may correct at least one XR content so as not to have the sense of separation in the real world.

More particularly, the processor 110 or 210 may correct a size of at least one XR content based on the recognized viewing direction and viewing angle, and distance from the target to the user, and the processor 110 or 210 may correct the shape of at least one XR content based on an angle between the inclination value measured from the inclination sensor and the position of the user.

In some of the embodiments, the processor 110 or 210 may compare colors between at least one XR content of the target and the facility surrounding the target and calculate a degree of identification based on the comparison result. Furthermore, in the case that the degree of identification is unable to satisfy a preconfigured condition, the processor 110 or 210 may correct the color of at least one XR content to increase the degree of identification.

Figure 12:
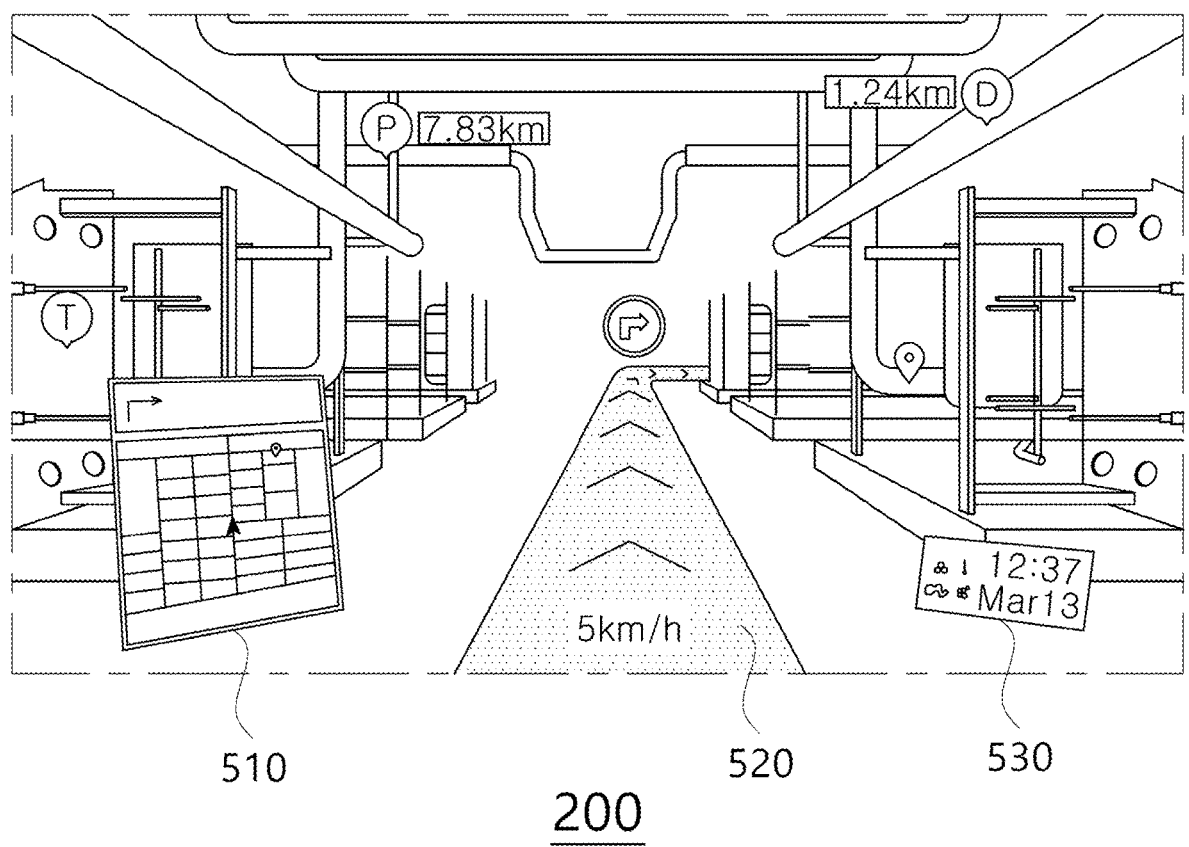
FIG. 12 is a diagram illustrating a moving path of a movement of the user shown in FIG. 11 displayed with at least one XR content.

FIG. 12 is a diagram illustrating a moving path of a movement of the user shown in FIG. 11 displayed with at least one XR content.

Referring to FIG. 12, the processor 110 or 210 may determine the moving direction of the user based on the sensing information. Furthermore, the processor 110 or 210 may anticipated a next target according to the movement of the user based on the determined moving direction.

The processor 110 or 210 may output at least one XR content indicating the determined moving direction through the electronic device 200 as shown in FIG. 12.

Referring to FIG. 12, the processor 110 or 210 may output at least one XR content 510 indicating a map of the construction site including a current position of the user through the electronic device 200.

Referring to FIG. 12, the processor 110 or 210 may output at least one XR content 530 indicating a date and a time through the electronic device 200.

In one example, the processor 110 or 210 may calculate an anticipated moving path of the user based on the determined moving direction and generate a list of anticipated call targets included in the calculated anticipated moving direction.

The processor 110 or 210 may receive a reason for visiting the construction site of the user wearing the electronic device 200. In addition, the processor 110 or 210 may select a target that the user is required to check in the construction site based on the reason for visiting the construction site and a target recommended to be checked.

The processor 110 or 210 may generate moving path information of the user based on the target required to be checked, generate augmented reality-based moving path content based on the moving path information, and output the content to the electronic device 200 as shown in FIG. 12.

The processor 110 or 210 may output at least one XR content indicating the target required to be checked to the electronic device 200.

The processor 110 or 210 may output a list of targets recommended to be checked to the electronic device 200 and receive an input on whether the list is checked from the user. In addition, the processor 110 or 210 may correct the moving path information based on the input signal of the user for the targets recommended to be checked.

In one embodiment, the processor 110 or 210 may generate a list of the targets which are expected to be called by the user in the BIM data based on a category of the call target up to an analysis time. In addition, the processor 110 or 210 may generate an anticipated moving path of the user in the construction site based on the generated list.

The processor 110 or 210 may generate the list and the anticipated moving path based on a control signal of the user which is input for the category of the call target and at least one XR content of the call target.

The processor 110 or 210 may generate information for precautions of moving based on the BIM data and the anticipated moving path of the construction site and output at least one XR content for the information for precautions to the electronic device 200.

In one embodiment, in the case that a call signal for calling a specific position is included in the received signal, the processor 110 or 210 may output at least one XR content for guiding the moving path to the corresponding position to the electronic device 200.

In one embodiment, in the case that a first target included in the BIM data of the construction site is called but not in the periphery of the user or in the user's field of view, the processor 110 or 210 may output at least one XR content for asking whether a movement to the position of the first target is wanted to the electronic device 200.

In addition, in the case that an input signal indicating that the user wants to move to the position of the first target is received from the user, the processor 110 or 210 may output at least one XR content indicating the moving path to move to the position of the first target is wanted to the electronic device 200.

When a call signal for calling a specific target is detected, the processor 110 or 210 may encode the call signal based on a preconfigured algorithm and load the BIM data corresponding to the code in the BIM data.

In one embodiment, the processor 110 or 210 may extract coordinate values of object units according to information IDs of the objects in the BIM data and provide call IDs based on the information IDs and the coordinate values and store them in the storage 130 or 230.

So far, the method according to an embodiment of the present disclosure described above may be implemented in a program (or application) to be combined and executed with the server 100, which is hardware, and stored in a medium.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the location (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer may access, or various recording media on the computer of the user. In addition, the media may be distributed to a computer system connected to a network, and a computer-readable code may be stored in a distribution manner.

Steps or operations of the method or algorithm described in relation to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

Advantageous Effects

According to the technical solution to solve the problem according to the present disclosure, there is an effect of displaying object in a construction site with XR content without using a marker.

The advantages of the present disclosure are not limited to the above-mentioned advantages, and other advantages, which are not specifically mentioned herein, will be clearly understood by those skilled in the art from the following description.

The invention claimed is:

1. An electronic device of wearable form worn on a user's head and outputting XR content in front of the user, comprising:
a sensing unit including at least one sensor;
a display unit; and
a processor configured to:
map BIM data of a construction site in which the user is located to a space within a user's field of view based on sensing information sensed and obtained from the sensing unit,
control such that the XR content corresponding to a target is displayed on the display unit, based on a call signal of the target in relation to the construction site being included in a voice-based input signal received from the sensing unit,
generate the XR content based on the BIM data of the target, and
display the generated XR content on an area corresponding to the target on the display unit.

2. The electronic device according to claim 1, wherein the processor is configured to: convert the voice-based input signal to a text based on speech-to-text (STT) technology, and determine the target based on the converted text.

3. The electronic device according to claim 2, wherein the processor is configured to: calculate a degree of relationship between at least one object in the user's field of view and the target based on a preconfigured criterion, and determine an object of which calculated degree of relationship is highest to be related to the target among the objects.

4. The electronic device according to claim 3, wherein the processor is configured to: determine a discrimination view within the user's field of view, calculate a degree of relationship between at least one object in the discrimination view and the target based on the preconfigured criterion, and determine an object of which calculated degree of relationship is highest to be related to the target among the objects.

5. The electronic device according to claim 2, wherein, based on the sensing information for a motion gesture of the user being included in the sensing information, the processor is configured to determine the target based on the motion gesture and the call signal included in the sensing information.

6. The electronic device according to claim 1, wherein the processor is configured to: recognize a viewing direction and a viewing angle of the user based on the sensing information, and map the BIM data to the space within the user's field of view based on the recognized viewing direction and viewing angle.

7. The electronic device according to claim 6, wherein the sensing unit includes a camera for photographing a front of the electronic device, and wherein the processor is configured to determine the target based on the call signal and the photographed image of the camera.

8. The electronic device according to claim 6, wherein the sensing unit includes an inclination sensor, and wherein the processor is configured to correct the generated XR content based on the recognized viewing direction and viewing angle, and an inclination value obtained from the inclination sensor.

9. The electronic device according to claim 1, wherein the processor is configured to: calculate a moving direction of the user in the construction site based on the sensing information, and anticipate a next target according to a movement of the user based on the calculated moving direction.

10. The electronic device according to claim 1, wherein the processor is configured to generate a list of the targets which are expected to be called by the user in the BIM data based on a category of the call target.

11. The electronic device according to claim 10, wherein the processor is configured to generate an anticipated moving path of the user in the construction site based on the generated list.

12. The electronic device according to claim 11, wherein the processor is configured to generate the list and the anticipated moving path based on a control signal of the user which is input for the category of the call target and the XR content of the call target.

13. A server for outputting XR content to an electronic device of wearable form worn on a user's head, comprising:
a communication unit configured to communicate with the electronic device; and
a processor configured to:
map BIM data of a construction site in which the user is located to a space within a user's field of view based on sensing information obtained from a sensing unit of the electronic device and received through the communication unit,
control such that the XR content corresponding to a target is transmitted to the electronic device and displayed on a display unit, based on a call signal of the target in relation to the construction site being included in a voice-based input signal received from the electronic device,
generate the XR content based on the BIM data of the target such that it is displayed on an area corresponding to the target on the display unit.

14. A method performed by an electronic device of wearable form worn on a user's head and outputting XR content in front of the user, comprising:
receiving sensing information sensed and obtained from a sensing unit including at least one sensor;
mapping BIM data of a construction site in which the user is located to a space within a user's field of view based on the sensing information;
displaying the XR content corresponding to a target on the display unit, based on a call signal of the target in relation to the construction site being included in a voice-based input signal received from the sensing unit,
generating the XR content based on the BIM data of the target; and
displaying the generated XR content on an area corresponding to the target on the display unit.

15. The method according to claim 14, wherein displaying the XR content further comprising: calculating a degree of relationship between at least one object in the user's field of view and the target based on a preconfigured criterion, and determining an object of which calculated degree of relationship is highest to be related to the target among the objects.

16. The method according to claim 14, wherein calculating the degree of relationship comprising: determining a discrimination view within the user's field of view; and calculating a degree of relationship between at least one object in the discrimination view and the target based on the preconfigured criterion.

17. The method according to claim 14, wherein the sensing unit includes an inclination sensor, and wherein generating the XR content further comprises correcting the generated XR content based on a viewing direction and a viewing angle of the user, and an inclination value obtained from the inclination sensor.

18. The method according to claim 14, further comprising: generating a list of the targets which are expected to be called by the user in the BIM data based on a category of the call target, after displaying the XR content.

* * * * *